April 11, 1939.     C. PAULSON     2,153,989
ELECTRICAL TESTING APPARATUS
Filed Oct. 15, 1937
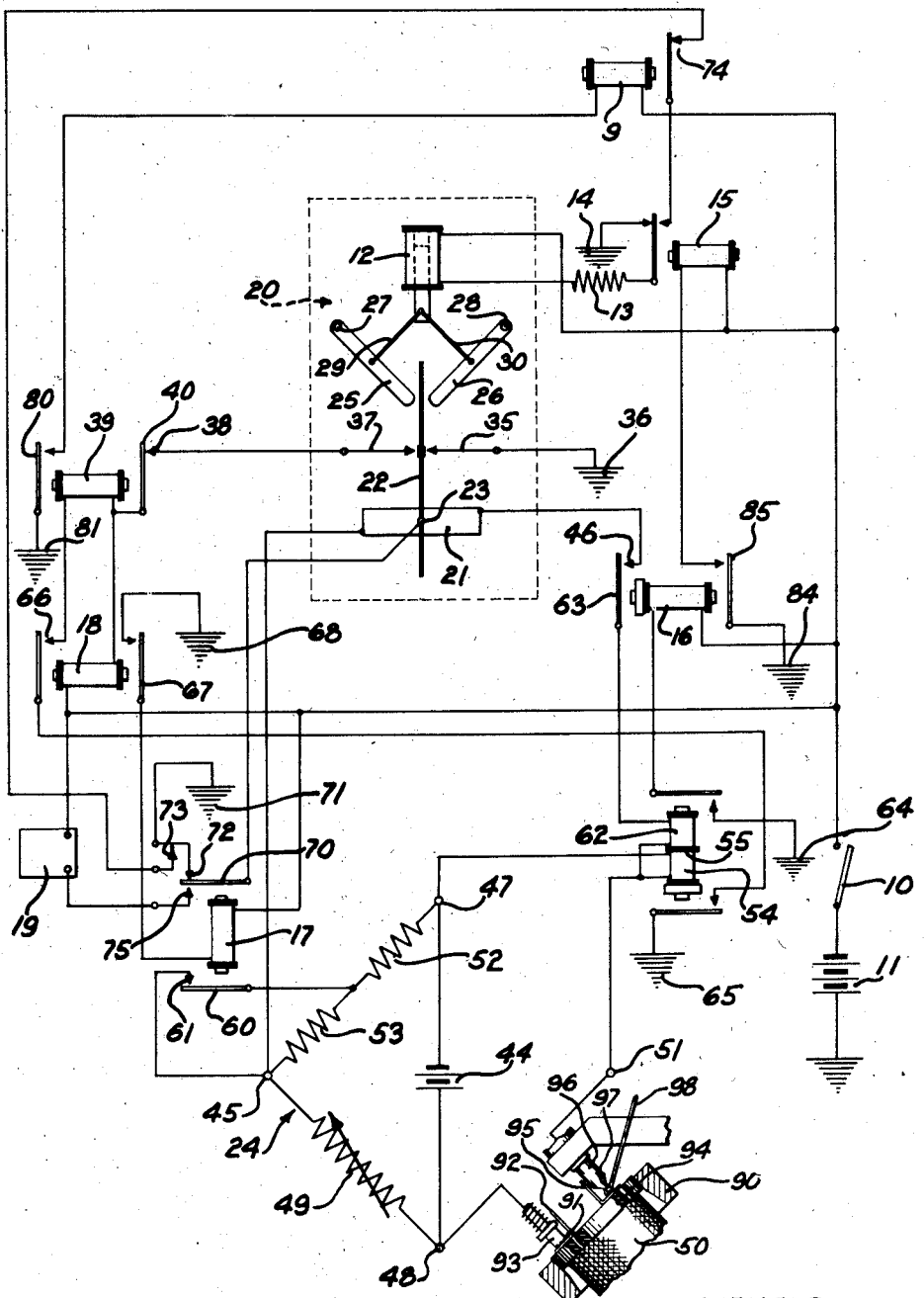
INVENTOR
C. PAULSON
BY Emery Robinson,
ATTORNEY Patented Apr. 11, 1939

2,153,989

UNITED STATES PATENT OFFICE 2,153,989

ELECTRICAL TESTING APPARATUS

Christian Paulsen, Elmhurst, Ill., assignor to Western Electric Company, Incorporated, New York, N. Y., a corporation of New York Application October 15, 1937, Serial No. 169,176

17 Claims. (Cl. 175—183)

This invention relates to electrical testing apparatus and more particularly to apparatus for testing an electrical coil to determine if it has certain electrical characteristics.

It is an object of the present invention to provide a simple and accurate apparatus for making electrical tests expeditiously.

In accordance with one embodiment of the invention, an apparatus is provided for determining automatically whether the electrical resistance of a coil under test falls within predetermined selected limits, upon the connection of the coil terminals to the apparatus. This apparatus utilizes a Wheatstone bridge circuit having a winding of a relay serving as one of its ratio arms and having a galvanometer type relay as a bridge directional unbalance detector, together with an audible signalling device which operates when the coil is within the selected limits. The coil is connected to the bridge circuit by engaging one of its terminals with a contact connected to the bridge and by engaging the other of its contacts with a soldering iron connected to the bridge and being used to melt solder for connecting one end of the coil to the terminal whereby the coil is tested during the soldering operation.

A better understanding of the invention may be had by reference to the following detailed description of the preferred embodiment of the invention when considered in conjunction with the accompanying drawing, wherein a single schematic view shows diagrammatically the features thereof.

Referring now to the drawing, the reference numeral 10 designates a main switch whereby grounded battery at 11 may be connected to the apparatus. Upon closure of the switch 10, grounded battery will be connected to one side of the winding of a solenoid 12, the other side of the winding of which is connected through a suitable resistance 13 to ground at 14 through a break make contact of a relay 15. The switch 10, upon its closure, also supplies grounded battery to one side of the winding of each of relays 9, 15, 16, 17 and 18 and a buzzer 19 so that the closure of the switch 10 will place the apparatus in condition for operation.

The solenoid 12 forms part of a meter type relay 20, the parts of which are shown enclosed in dotted lines. This relay includes a galvanometer type movable coil 21, having fixed thereto a contactor 22, which will be rocked about a coil pivot 23 in either of two directions, depending upon the direction of unbalance of a bridge circuit indicated generally at 24. The contactor 22 is normally held in its mid position by a pair of levers 25 and 26 pivoted at 27 and 28 and connected to the movable element of the solenoid 12 by a pair of links 29 and 30, respectively. The contactor 22 is adapted, upon movement thereof by the movable coil 21, in a clockwise direction to engage a fixed contact 35 connected to ground at 36, and upon movement thereof in a counter-clockwise direction by the moving coil 21, to engage a fixed contact 37 connected to a fixed contact 38 of a relay 39. One side of the winding of the relay 39 is connected to its back contact 40 and to grounded battery through the winding of the relay 18. The moving coil 21 has one end of its winding connected to a point 45 on the bridge 24 and its other end is connected to a fixed contact 46 of relay 16.

The bridge circuit 24 has a battery 44 connected thereacross between the points 47 and 48 and in the arm thereof between the points 45 and 48 has a variable resistance 49, the value of which may be adjusted to the value desired in a coil 50 to be tested.

The coil 50 is shown in position in a fixture 90, wherein one end 91 of its winding, previously soldered to a terminal 92, is connected through the terminal 92 to the point 48 of the bridge circuit by a spring pressed contactor 93 and wherein the other end 94 of its winding, which is being soldered to a second terminal 95, is connected through a soldering iron 96 to a point 51 on the bridge, the terminal 95 and solder 97 melted from a solder wire 98 serving to make a good conducting connection between the coil and soldering iron. The coil 50 is thus connected across an arm of the bridge circuit between the point 48 and a point 51. The arm of the bridge between the points 45 and 47 has a pair of resistances 52 and 53 therein which may be of any suitable value chosen in accordance with the value of a winding 54 of a double wound relay 55 which is connected across the bridge circuit from the point 47 to the point 51 and forms one of the ratio arms of the bridge. In the particular embodiment of the invention disclosed herein, the winding 54 has 500 ohms resistance and the resistances 52 and 53 have a resistance of 475 and 50 ohms, respectively.

The front contact 60 of the relay 17 is connected to a point on the arm 45—47 between the resistances 52 and 53, whereby upon energization of the relay 17, the resistance 53 will be cut out of the bridge circuit due to the engagement of the contact 60 with a fixed contact 61 connected to the point 45 of the bridge.

The double wound relay 55 has a second winding 62, one side of which is connected to the point 51 and the other side of which is connected to a movable contact 63 of relay 16, which, upon energization of relay 16, will engage the fixed contact 46. Energization of the double wound relay 55, which is a retarded relay, will connect ground at 64 to one side of the winding of relay 16, which is also a retarded relay, thereby to energize the relay 16 and energization of the relay 55 will also connect ground at 65 to a make contact 66 of the relay 18. The other make contact, designated 67, of the relay 18 is connected to ground at 68 and upon energization of the relay 18, the ground at 68 will be connected to one side of the winding of the relay 17 to energize it. In addition to the make contact 60, the relay 17 is equipped with a break-make contact 70 normally connected to ground at 71 and to the contactor 22 through a make before break contact 72, which, before breaking with the contact 70, will make on a contact 73 connected to the break contact 74 of the relay 9. Upon energization of the relay 17, the contact 70 will engage a contact 75 connected to one side of the winding of the buzzer 19. The relay 39 is equipped with a grounded make contact 80, which, upon energization of the relay, will complete a circuit from ground at 81 through the winding of the relay 9 and switch 10 to grounded battery at 11, thereby energizing the relay 9.

It is believed that a complete understanding of the purposes and operation of the hereinbefore described apparatus and circuit connections may be had from the following description of the operation thereof. The test set is placed in condition to operate by the closure of the switch 10, which, as pointed out hereinbefore, will supply grounded battery at 11 to the various relays and the solenoid 12 and the solenoid will immediately be operated over a circuit path, from grounded battery at 11, through switch 10, the winding of the solenoid, the resistance 13 to ground at 14, thereby moving the arms 25 and 26 upwardly to center the contactor 22 and hold it in its mid position. With the apparatus in this condition, the insertion of the coil 50, to be tested, in the arm 48—51 of the bridge circuit will complete the bridge circuit and cause relay 55 to operate on its winding 54. As soon as relay 55 operates, it will close a circuit from ground at 64 through the winding of relay 16 to grounded battery at 11, thereby operating relay 16, which, in turn, upon its operation, will connect the moving coil 21 in series with the winding 62 of the relay 55 across the points 45 and 51 of the bridge and will close a circuit from ground at 84 through its make contact 85 to one side of the winding of relay 15, the other side of the winding of which is connected to the grounded battery at 11 through switch 10. The completion of the circuit from ground at 84 to grounded battery 11 will operate relay 15, thereby transferring its movable contact from the back to the front contact and break the ground connection at 14 to the solenoid 12, to release the arms 25 and 26 and permit the movement of the contactor 22 into engagement with either of the stationary contacts 35 or 37. The direction of movement of the contactor 22 will depend upon the direction of current in the moving coil 21.

If the resistance of the coil under test is equal to or less than the permissible maximum limit, the current in the moving coil 21 will cause the contactor 22 to move into engagement with the contact 37.

The closure of the contact between the contactor 22 and contact 37 will complete a circuit from grounded battery through the switch 10, winding of relay 18, back contacts 40 and 38 of relay 39, through the contactor and the contacts 70 and 72 of relay 17 to ground at 71. The operation of relay 18 prepares a path for the subsequent operation of relay 39 and closes a circuit from ground at 68 through contact 67, the winding of relay 17 and switch 10 to grounded battery at 11. In operating, the relay 17 will attract contact 70 and the circuit from ground at 71 will make on contact 73 before it breaks from contact 70 to complete a circuit from ground at 71 through contact 73 of relay 17, contact 74 of relay 9, through the resistance 13 and winding of solenoid 12, to grounded battery at 11, which operates the solenoid, thereby causing the arms 25 and 26 to restore the contactor 22 to its mid position and hold it there until the solenoid 12 is released. Upon completely operating, the relay 17 short circuits the section of the bridge arm 45—47 which includes the resistance 53, thereby preparing the apparatus to check the coil 50 under test for its minimum resistance, the coil having been tested for its maximum resistance. The operation of the relay 17 also opens the short circuit of the winding of relay 39, permitting it to operate. The operation of the relay 39 opens the circuit from contact 37 and closes a circuit from ground at 81 through contact 80 and the winding of relay 9 to grounded battery 11, thereby operating relay 9. The solenoid 12 having been operated to restore the contactor 22 to its mid position, will thus be released by the operation of the relay 9 and in releasing will permit the movement of the contactor 22 in a direction depending upon the direction of the current in the moving coil 21.

If the resistance of the coil under test is equal to or greater than its permissible minimum limit, the current in the moving coil 21 will cause the contactor 22 to engage contact 35. If contactor 22 engages contact 35, a circuit will be completed from ground at 36 through the contactor, the contact 70 of relay 17, contact 75 of relay 17 through the winding of the buzzer 19 and switch 10 to grounded battery at 11, operating the buzzer. The operation of the buzzer is an indication that the coil under test is within the permissible maximum and minimum resistance limits and the coil may therefore be removed from the arm 48—51 of the bridge. The removal of the coil from the bridge will cause the double wound relay 55 to release due to the interruption of the circuit through its winding 54 and when the relay 55 falls back, the circuit will be restored to normal and another test may be initiated by inserting another coil in the arm 48—51 of the bridge circuit.

If the coil under test has resistance greater than the maximum permissible, the circuit from ground at 71 through relay coil 18 will not be completed and the buzzer 19 will not operate. If, on the other hand, the coil under test is less than the maximum resistance, but is less than the permissible minimum, the circuit will operate to the point where relay 9 operates the release solenoid 12, but the contactor 22 will engage contact 37 a second time and the buzzer will fail to operate due to the break in its operating circuit at contact 38 of relay 39, now operated.

It will be noted that, since the relay 55 has one winding in the bridge circuit and controls the operation of the entire circuit, nothing will happen until a good connection is made through the melted solder at 97, but that as soon as a good connection has been made, the test will proceed so rapidly that the buzzer 19 will operate approximately as soon as a good soldered connection has been made and the operator may either reject or accept the coil as soon as the solenoid connection has been completed.

Although a specific embodiment of the invention has been described hereinbefore, and definite resistance values have been given to some of the resistance elements, it will be understood that the specific values cited have been used by way of example and that many modifications and alterations may be made in the circuit without departing from the scope of the invention, which is to be limited only by the appended claims.

What is claimed is:

1. In a testing apparatus, a Wheatstone bridge circuit, a signal operable when an article under test meets predetermined requirements, means for including the article in the unknown arm of the bridge circuit, and means operable by the completion of the bridge circuit through the article for initiating testing operations.

2. Electrical testing apparatus, including a Wheatstone bridge circuit, a meter type relay for determining the direction of flow of current across said bridge, means for connecting an article to be tested across one arm of the bridge circuit, a circuit automatically operable to change the value of an arm of said Wheatstone bridge, and means operable by the completion of a circuit through the article under test for initiating operation of said last mentioned circuit.

3. Electrical testing apparatus, including a Wheatstone bridge circuit, a relay having a winding thereof constituting one of the ratio arms of said bridge circuit, means controlled by said relay for changing the value of an arm of the bridge, and means for connecting the article under test as the unknown arm of the bridge.

4. In a Wheatstone bridge circuit, a galvanometer type relay connected across the bridge circuit, a control relay having a winding thereof constituting a ratio arm of the bridge circuit, and circuits controlled by the meter type relay and control relay for subjecting the article under test to a test for high resistance and a test for low resistance.

5. In a testing apparatus, a Wheatstone bridge circuit, a control relay having a winding thereof forming a ratio arm of said bridge circuit, a galvanometer type relay connected across said bridge circuit, and electrical circuits controlled by the galvanometer type relay and control relay for short-circuiting a portion of one of the arms of the bridge circuit if the article under test has predetermined characteristics.

6. In an apparatus for determining whether an article has a resistance within predetermined high and low limits comprising a Wheatstone bridge circuit, a galvanometer type relay having its movable coil connected across the bridge circuit, a relay having a winding thereof constituting the ratio arm of the bridge circuit, and means operable under control of the galvanometer type relay and control relay for changing an arm of the bridge circuit to determine if the article under test is higher than a predetermined minimum and lower than a predetermined maximum.

7. In a testing apparatus, a Wheatstone bridge circuit, means for including an article to be tested in an arm of the bridge circuit, a meter type relay having a movable coil, a contactor actuated by said coil, a pair of contacts associated with said contactor, means for normally holding said contactor away from the contacts, means operable upon the insertion of an article to be tested in the bridge circuit for releasing the meter type relay, means controlled by the meter type relay for resetting it to normal if the article under test is equal to or less than a predetermined maximum, means also controlled by the meter type relay for short-circuiting a portion of one arm of the bridge to prepare the bridge for a second test, an audible signal, and means for operating the audible signal if the meter type relay indicates that the article under test is equal to or more than a predetermined minimum.

8. Testing apparatus, including a Wheatstone bridge circuit, means for connecting an article to be tested in an arm of the bridge circuit, a contactor normally held in a predetermined position, a pair of contacts associated with said contactor, a coil movable in response to an unbalanced condition of the bridge for moving said contactor into engagement with either of the pair of contacts, depending on the direction of unbalance of the bridge circuit, a signalling device, and a control circuit controlled by said contactor operable to energize the signalling device when the article under test is within perdetermined limits.

9. Apparatus for determining whether an article has electrical characteristics within predetermined high and low limits, a Wheatstone bridge circuit having known resistances in three arms thereof, means for connecting an article to be tested in the fourth arm of said bridge circuit, means operable by the connection of the article in the bridge circuit for initiating a testing operation, a galvanometer type relay for indicating the direction of current flow across the bridge, means controlled by said galvanometer type relay for short circuiting part of the resistance of one arm of the bridge circuit if the current flow is in a predetermined direction, means controlled by said last mentioned means for resetting the galvanometer type relay to normal, and means operable to give a signal if the current flow across the bridge is in the opposite direction after the galvanometer type relay has been reset.

10. In an electrical testing apparatus, a Wheatstone bridge circuit adapted to receive a coil to be tested in one arm thereof, a meter type relay for indicating the direction of unbalance of the bridge, a relay having a winding thereof constituting a ratio arm of said bridge, circuits under control of said meter type relay and said last mentioned relay for changing the resistance of an arm of said bridge from a predetermined maximum resistance to a predetermined minimum resistance, and means operable under control of said circuits for indicating if the coil is within said maximum and minimum resistances.

11. Electrical testing apparatus, including a Wheatstone bridge circuit, means for determining the direction of flow of current across said bridge, means for connecting an article to be tested across one arm of the bridge circuit, a circuit automatically operable to change the value of an arm of said Wheatstone bridge, and means operable by a circuit extending through the article under test for initiating operation of said last mentioned circuit.

12. In a testing apparatus, a Wheatstone bridge circuit, a control relay having a winding thereof connected in one of the ratio arms of the bridge circuit, means operable under control of said relay for making two tests automatically, means for changing the value of an arm of the bridge circuit if the first of said tests indicates that a part meets certain requirements, and means connected thereto for indicating that the part is satisfactory if it meets both of said tests.

13. In a testing apparatus, a testing circuit, means for connecting an article to said testing circuit including a contact connected to one side of said circuit for connecting one side of the article to the circuit, a soldering iron connected to the other side of said circuit, and a supply of solder melted by said soldering iron for engaging the other side of the article and the soldering iron.

14. In a testing apparatus, a testing circuit having two open ends, a contact connected to one of said ends for engaging one side of an article to be tested, a soldering iron connected to the other end of the testing circuit, and molten solder for interconnecting the other side of the article and the soldering iron to complete the circuit.

15. In a testing apparatus, a testing circuit for making a plurality of tests, said circuit having two open ends and being adapted upon completion to make said tests in automatic succession, a contact connected to one of said ends for engaging one side of an article to be tested, a soldering iron connected to the other end of the testing circuit, and molten solder for interconnecting the other side of the article and the soldering iron to complete the circuit.

16. In a testing apparatus, a testing circuit for making a plurality of tests on an article, a gap in said circuit, means for connecting an article in said gap including a contact at one end of said gap, a soldering iron connected to the other end of said gap, a supply of solder melted by said iron for cooperating with said contact to close the gap in the circuit through the article, and means operable upon the completion of said circuit for initiating operation of the testing circuit.

17. In a testing apparatus, a Wheatstone bridge circuit, a relay having a winding thereof constituting one of the ratio arms of said bridge circuit, a soldering iron connected in the unknown arm of said bridge circuit, a contact cooperating with said soldering iron and connected to the other side of the unknown arm of the bridge circuit, means for directing the contacts of a coil to be tested and soldered into engagement with said contact and said soldering iron to complete the bridge circuit, energize said relay and simultaneously perform a soldering operation at the coil terminal, means controlled by said relay for initiating a testing operation, and means controlled by the bridge circuit and the relay for indicating whether or not the coil under test is within predetermined limits.

CHRISTIAN PAULSON.